Jan. 30, 1951     W. H. SHORTELL     2,539,796

TENSION CONTROL FOR HACK SAW BLADES

Filed Oct. 18, 1945

INVENTOR
WILLIAM H. SHORTELL

BY Frederic P. Wofield
ATTORNEY

Patented Jan. 30, 1951

2,539,796

UNITED STATES PATENT OFFICE 2,539,796

TENSION CONTROL FOR HACKSAW BLADES

William H. Shortell, Greenfield, Mass., assignor to Millers Falls Company, Greenfield, Mass., a corporation of Massachusetts Application October 18, 1945, Serial No. 622,957

4 Claims. (Cl. 143—156)

This invention relates to tension control for hack saw blades and constitutes an improvement over the tension gauge for hack saw blades shown in my patent, No. 2,337,629.

The object of the invention is to provide means for controlling the reactive effect of the tension spring in a device such as that shown in my patent above referred to, or in any other construction in which resilient tension is imposed upon a hack saw blade when in use, and thereby eliminate possibility of injury to the various parts of the combined mechanism, or bystanders, should breakage occur, as by stripping of a stud or the stripping of threads, such that the control of the spring pressure is relieved and violent reaction of the spring permitted.

Other objects of the invention will in part be obvious and will in part appear hereinafter.

The invention accordingly comprises the features of construction, combination of elements, and arrangement of parts, which will be exemplified in the constructions hereinafter set forth, and the scope of the application of which will be indicated in the claims.

For a fuller understanding of the nature and objects of the invention reference should be had to the following detailed description taken in connection with the accompanying drawing, in which.

Figure 1:
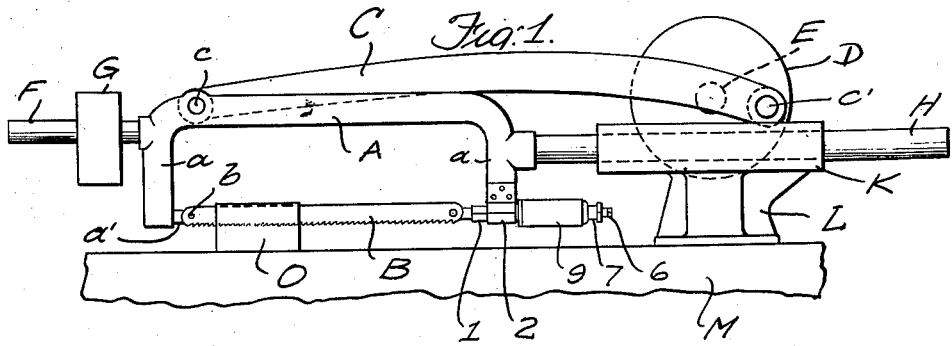
Fig. 1 is a side elevational view of a power hack saw, showing the general relation of parts.
Figure 2:
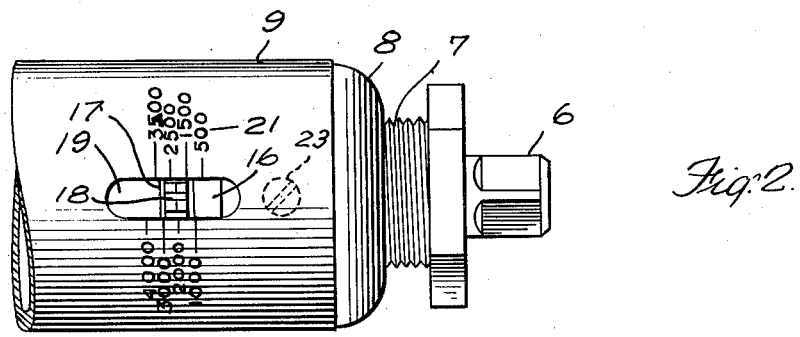
Fig. 2 is a view of one end of the tensioning device and gauge as it appears in top plan.

As shown in Fig. 1 the general organization of a power hack saw machine includes a saw frame A which carries the saw blade B in a customary way between the two arms $a$, $a$. This saw frame may be reciprocated in any conventional manner as by the connecting rod C, pivoted at one end $c$ to the saw frame A and at its other end $c'$ to a rotating member D carried upon the shaft E and driven from any desired source of power.

Saw frame A carries upon a projecting stud F a weight G which when adjusted along the stud F adjusts the downward weight upon blade B. The saw frame carries at its other end a stud shaft H passing freely through a sleeve K carried by a support L upon the frame M. The work or work carrier is indicated at O.

Figure 3:
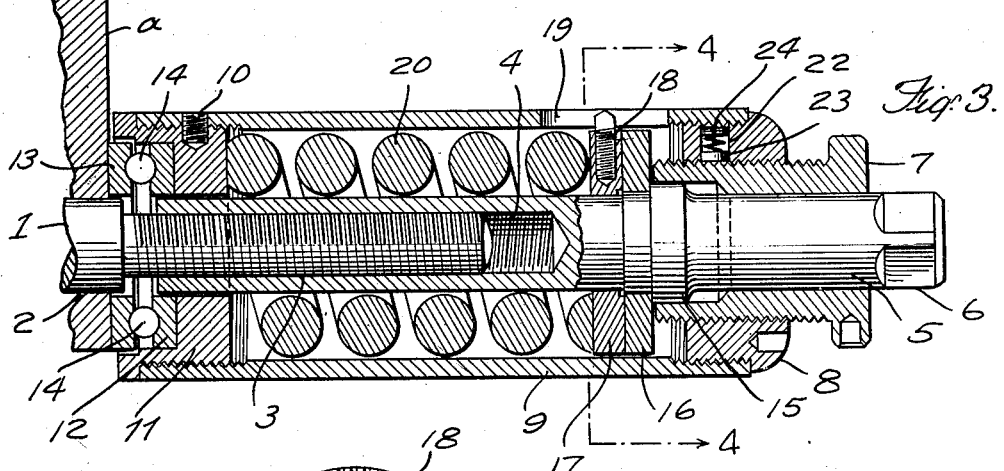
Fig. 3 is a section showing the tension device and gauge with my improvement for preventing violent reaction of the tensioning spring in case of any breakage which would otherwise result in release and violent reaction of the spring.
Figure 4:
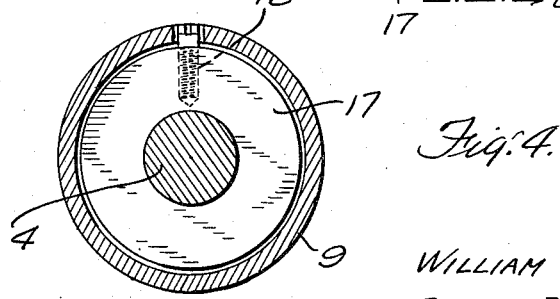
Fig. 4 is a cross sectional view on the line 4—4 of Fig. 3.

Saw blade B is pierced at its ends with holes through which pass studs $b$, $b$ at each end for mounting it in the ordinary and conventional way between a fixed stud $a'$ carried by left-hand arm $a$ and stud 1 which passes freely through a sleeve 2 in the lower end of the right-hand saw frame arm $a$. Stud 1 is threaded at its outer end as at 3 and this threaded end cooperates with an internally threaded sleeve 4 carried at the inner end of the member 5 shaped at its outer end at 6 for rotation by a conventional handle. Rotatable upon stud member 5 is externally threaded sleeve 7 threaded through nut 8 which is threaded into one end of the enclosing tube 9. This tube 9 carries at the left-hand end, as shown in Fig. 3, and attached thereto by the screw 10 the member 11 threaded into the end of the tube. This member 11 carries a disk 12 opposing disk 13 carried by the saw frame arm $a$ and between these disks are mounted antifriction balls 14. Stud member 5 is provided with a circular projecting rib 15 the inner face of which contacts disk 16 mounted upon the stud. Mounted just inside the disk 16 is a second disk 17 which carries at its upper end a threaded stud 18 projecting through an opening 19 in the tube 9. Between disk 17 and member 11 is mounted a spiral spring 20. A face of the tube 9 is inscribed at 21 to show in pounds the amount of tension imposed upon the saw blade by the compression of the spring 20. At the right-hand end of the tube 9 is shown a recess 22 bored out to contain the washer 23 pressed by small spiral spring 24 against the sleeve 7 and tending to hold this sleeve in any adjusted position as against vibration or accidental displacement.

In operation any desired tension may be placed upon the saw blade B by turning of the stud 5. This rotates the sleeve 4 and tends to cause relative telescoping of this sleeve with the threaded stud 3. The advancing movement of the stud 5 thus caused carries with it the disks 16 and 17, and when rotated in the proper direction increases the tension upon the spring 20 and thereby imposes any desired spring tension upon the saw blade B.

When the saw blade B is given the desired tension as can be determined by a reading of the scale 21 in pounds, the sleeve 7 is advanced to a point such that there is only a small clearance between it and the disk 16. This clearance is enough to allow for expansion of the saw, or pin hole stretching, but not enough to cause the tensioning device to bounce from the machine should the stud break or a stud strip, the result of which otherwise might be to cause possible injury to parts of the machine and to bystanders.

With the construction as shown when it is desired to change a blade, it is only necessary to unscrew the stud 5 about one turn and all tension is removed. The blade may then be changed and as the spring is held compressed by the sleeve 7 it is only necessary to tighten it again about one revolution and the full load is transferred from the sleeve to tension the blade.

It will be seen that turning of the stud member 5 rotates the entire tube 9, such rotation being rendered more easy by the ball thrust bearings 14 which are especially useful when tensioning heavy blades which require tension of two thousand pounds and higher.

It will thus be seen that I have in the construction shown provided a simple, easily assembled, easily operated and efficient device for imposing any desired spring tension upon the saw blade while at the same time eliminating the liability to damage caused by breakage or stripping of any of the parts, which would permit violent reaction of the tensioning spring in the absence of means for limiting such reaction.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In a hack saw blade tensioning device, a hack saw blade, a threaded stud, mounted to permit reciprocation thereof, connected to the blade at one end, an internally threaded sleeve threaded upon the end of said stud, a spiral spring surrounding said sleeve, a follower carried with said sleeve and bearing against one end of said spring whereby rotation of the sleeve in one direction tends to compress said spring and impose a tension upon said saw blade and an adjustable member on the side of said follower away from said blade which can be set to limit the reactive distance of travel of said spring.

2. In a hack saw blade tensioning device, a frame, a blade carried thereby, a reciprocable stud connected to the blade at one end, said stud being threaded at its free end, an operating stud member carrying an internally threaded sleeve cooperating with the externally threaded end of the saw blade stud, a spiral spring surrounding said sleeve, a tubular member surrounding said spring, a member within said tube connected to said tubular member forming a support for the inner end of said spring and supported against the saw frame, a follower for said spring carried at the other end of said tube, said follower adapted to be advanced to increase the tension of said spring and accordingly the tension upon the saw blade upon rotation of the sleeve in one direction, and a member, threaded into the outer end of said tube, adapted to be set to limit the reactive effect of the return of said spring upon breakage of the saw blade connection.

3. In a hack saw blade tensioning device, a frame, a blade carried thereby, a reciprocable stud connected to the blade at one end, said stud being threaded at its free end, an operating stud member carrying an internally threaded sleeve cooperating with the externally threaded end of the saw blade stud, a spiral spring surrounding said sleeve, a tubular member surrounding said spring, a member within said tube connected to said tubular member forming a support for the inner end of said spring and supported against the saw frame, antifriction bearings interposed between said tube and the saw frame, a follower for said spring carried at the other end of said tube, said follower adapted to be advanced to increase the tension of said spring and accordingly the tension upon the saw blade upon rotatation of the sleeve in one direction, and a member threaded into the outer end of said tube adapted to be set to limit the reactive effect of the return of said spring upon breakage of the saw blade connection.

4. In a hack saw blade tensioning device, a frame, a blade carried thereby, a reciprocable stud connected to the blade at one end, said stud being threaded at its free end, an operating stud member carrying an internally threaded sleeve cooperating with the externally threaded end of the saw blade stud, a spiral spring surrounding said sleeve, a tubular member surrounding said spring, a member within said tube connected to said tubular member forming a support for the inner end of said spring and supported against the saw frame, a follower for said spring carried at the other end of said tube, said follower adapted to be advanced to increase the tension of said spring and accordingly the tension upon the saw blade upon rotation of the sleeve in one direction, a member threaded into the outer end of said tube adapted to be set to limit the reactive effect of the return of said spring upon breakage of the saw blade connection, and a spring-pressed washer bearing against said threaded member tending to hold it as against accidental displacement from its adjusted position.

WILLIAM H. SHORTELL.

REFERENCES CITED

The following references are of record in the file of this patent:

UNITED STATES PATENTS

| Number | Name | Date |
|---|---|---|
| 381,466 | Dickerson | Apr. 17, 1888 |
| 1,205,368 | Magin | Nov. 21, 1916 |
| 2,337,629 | Shortell | Dec. 28, 1943 |
| 2,411,779 | Dillon et al. | Nov. 26, 1946 |

FOREIGN PATENTS

| Number | Country | Date |
|---|---|---|
| 191,105 | Great Britain | Jan. 1, 1923 |
| 356,031 | Great Britain | Sept. 3, 1931 |
| 797,336 | France | Feb. 8, 1936 |